United States Patent
Shaffer

(10) Patent No.: US 10,082,301 B1
(45) Date of Patent: Sep. 25, 2018

(54) WATER HEATER APPLIANCE WITH A COLD WATER BYPASS

(71) Applicant: Haier US Appliance Solutions, Inc., Wilmington, DE (US)

(72) Inventor: Timothy Scott Shaffer, La Grange, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 15/466,081

(22) Filed: Mar. 22, 2017

(51) Int. Cl.
*F24H 4/04* (2006.01)
*F24D 19/10* (2006.01)
*F24H 9/20* (2006.01)
*G05D 23/13* (2006.01)

(52) U.S. Cl.
CPC ........... *F24D 19/1054* (2013.01); *F24H 4/04* (2013.01); *F24H 9/2007* (2013.01); *G05D 23/134* (2013.01); *F24D 2220/0221* (2013.01); *F24D 2220/0271* (2013.01); *F24D 2220/042* (2013.01)

(58) Field of Classification Search
CPC ............................ F24D 19/1054; F24H 9/2007
See application file for complete search history.

(56) References Cited

U.S. PATENT DOCUMENTS

| | | | |
|---|---|---|---|
| 4,941,608 A * | 7/1990 | Shimizu | F24D 19/1051 236/12.12 |
| 7,298,968 B1 * | 11/2007 | Boros | F24D 17/00 392/441 |
| 8,438,864 B2 * | 5/2013 | Roetker | F24H 4/04 165/146 |
| 9,122,284 B2 | 9/2015 | Ferguson | |
| 2006/0024036 A1 * | 2/2006 | Scime | F24F 1/00 392/441 |
| 2008/0289811 A1 * | 11/2008 | Kariya | F24D 19/1033 165/300 |
| 2012/0024968 A1 * | 2/2012 | Beyerle | G05D 23/1346 236/12.11 |
| 2012/0104107 A1 | 5/2012 | Goncze | |
| 2014/0026970 A1 * | 1/2014 | DuPlessis | G05D 23/132 137/3 |
| 2015/0184889 A1 * | 7/2015 | Shaffer | F24H 9/2021 392/308 |

* cited by examiner

*Primary Examiner* — Nathaniel Herzfeld
(74) *Attorney, Agent, or Firm* — Dority & Manning, P.A.

(57) ABSTRACT

A water heater appliance includes an electronic mixing valve configured for adjusting a ratio of cold water from a cold water inlet conduit to hot water from a hot water outlet conduit at a mixed water outlet of the electronic mixing valve. A cold water bypass conduit extends between the cold water inlet conduit and the mixed water outlet conduit. A cold water bypass valve is on the cold water bypass conduit. A controller is configured to close the cold water bypass valve when a temperature measurement from a mixed water temperature sensor is less than a threshold temperature.

20 Claims, 4 Drawing Sheets

WATER HEATER APPLIANCE WITH A COLD WATER BYPASS

FIELD OF THE INVENTION

The present subject matter relates generally to heat pump water heaters and mixing valves for water heaters.

BACKGROUND OF THE INVENTION

Certain water heater appliances include a tank therein. Heating elements, such as gas burners, electric resistance elements, or sealed systems, heat water within the tank during operation of such water heater appliances. In particular, the heating elements generally heat water within the tank to a predetermined temperature. The predetermined temperature is generally selected such that heated water within the tank is suitable for showering, washing hands, etc.

During operation, relatively cool water flows into the tank, and the heating elements operate to heat such water to the predetermined temperature. Thus, the volume of heated water available at the predetermined temperature is generally limited to the volume of the tank. According, water heater appliances are sold in various sizes to permit consumers to select a proper tank volume and provide sufficient heated water. However, large water heater appliances with large tanks occupy large amount of space within a residence or business. In certain buildings, space is limited and/or expensive. Thus, utilizing large water heater appliances can be impractical and/or prohibitively expensive despite needing large volumes of heated water.

To provide relatively large volumes of heated water from relatively small tanks, certain water heater appliances utilize a mixing valve. The mixing valve permits water within the water heater's tank to be stored at relatively high temperatures. The mixing valve mixes such high temperature water with relatively cool water in order to bring the temperature of such water down to suitable and/or more usable temperatures. Thus, such water heater appliance can provide relatively large volumes of heated water without requiring large tanks.

Mixing valves can have drawbacks. For example, adjusting the ratio of cold water to hot water with the mixing valve takes time. Thus, water flowing from the mixing valve is initially not at the set temperature during a water draw event. Accordingly, a water heater appliance having a mixing valve that includes features for limiting a temperature of water downstream of the mixing valve would be useful. In particular, a water heater appliance having a mixing valve and that includes features for limiting a temperature of water downstream of the mixing valve at a start of water draw event while the mixing valve is adjusting to a set temperature would be useful.

BRIEF DESCRIPTION OF THE INVENTION

The present subject matter provides a water heater appliance with an electronic mixing valve configured for adjusting a ratio of cold water from a cold water inlet conduit to hot water from a hot water outlet conduit at a mixed water outlet of the electronic mixing valve. A cold water bypass conduit extends between the cold water inlet conduit and the mixed water outlet conduit. A cold water bypass valve is on the cold water bypass conduit. A controller is configured to close the cold water bypass valve when a temperature measurement from a mixed water temperature sensor is less than a threshold temperature. Additional aspects and advantages of the invention will be set forth in part in the following description, or may be apparent from the description, or may be learned through practice of the invention.

In a first exemplary embodiment, a water heater appliance is provided. The water heater appliance includes a casing. A tank is positioned within the casing. A heating element is operable to heat water within the tank. A cold water inlet conduit is mounted to the tank, and a hot water outlet conduit is mounted to the tank. An electronic mixing valve is positioned within the casing. The electronic mixing valve has a cold water inlet and a hot water inlet. The cold water inlet of the electronic mixing valve is in fluid communication with the cold water inlet conduit. The hot water inlet of the electronic mixing valve is in fluid communication with the hot water outlet conduit. The electronic mixing valve is configured for adjusting a ratio of cold water from the cold water inlet conduit to hot water from the hot water outlet conduit at a mixed water outlet of the electronic mixing valve. A mixed water outlet conduit is in fluid communication with the mixed water outlet of the electronic mixing valve. A mixed water temperature sensor is positioned proximate the mixed water outlet of the electronic mixing valve. A cold water bypass conduit extends between the cold water inlet conduit and the mixed water outlet conduit. A cold water bypass valve is on the cold water bypass conduit. The cold water bypass valve is operable to provide selective fluid communication between the cold water inlet conduit and the mixed water outlet conduit through the cold water bypass conduit. A controller is in operative communication with the cold water bypass valve and the mixed water temperature sensor. The controller is configured to close the cold water bypass valve when a temperature measurement from the mixed water temperature sensor is less than a threshold temperature.

In a second exemplary embodiment, a heat pump water heater appliance is provided. The heat pump water heater appliance includes a casing. A tank is positioned within the casing. A sealed system is operable to heat water within the tank. The sealed system includes a compressor, a condenser, an expansion device and an evaporator charged with refrigerant. A cold water inlet conduit is mounted to the tank, and a hot water outlet conduit is mounted to the tank. An electronic mixing valve is positioned within the casing. The electronic mixing valve has a cold water inlet and a hot water inlet. The cold water inlet of the electronic mixing valve is in fluid communication with the cold water inlet conduit. The hot water inlet of the electronic mixing valve is in fluid communication with the hot water outlet conduit. The electronic mixing valve is configured for adjusting a ratio of cold water from the cold water inlet conduit to hot water from the hot water outlet conduit at a mixed water outlet of the electronic mixing valve. A mixed water outlet conduit is in fluid communication with the mixed water outlet of the electronic mixing valve. A mixed water temperature sensor is positioned proximate the mixed water outlet of the electronic mixing valve. A cold water bypass conduit extends between the cold water inlet conduit and the mixed water outlet conduit. A cold water bypass valve is on the cold water bypass conduit. The cold water bypass valve is operable to provide selective fluid communication between the cold water inlet conduit and the mixed water outlet conduit through the cold water bypass conduit. A controller is in operative communication with the cold water bypass valve and the mixed water temperature sensor. The controller is configured to close the cold water bypass valve when a temperature measurement from the mixed water temperature sensor is less than a threshold temperature.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
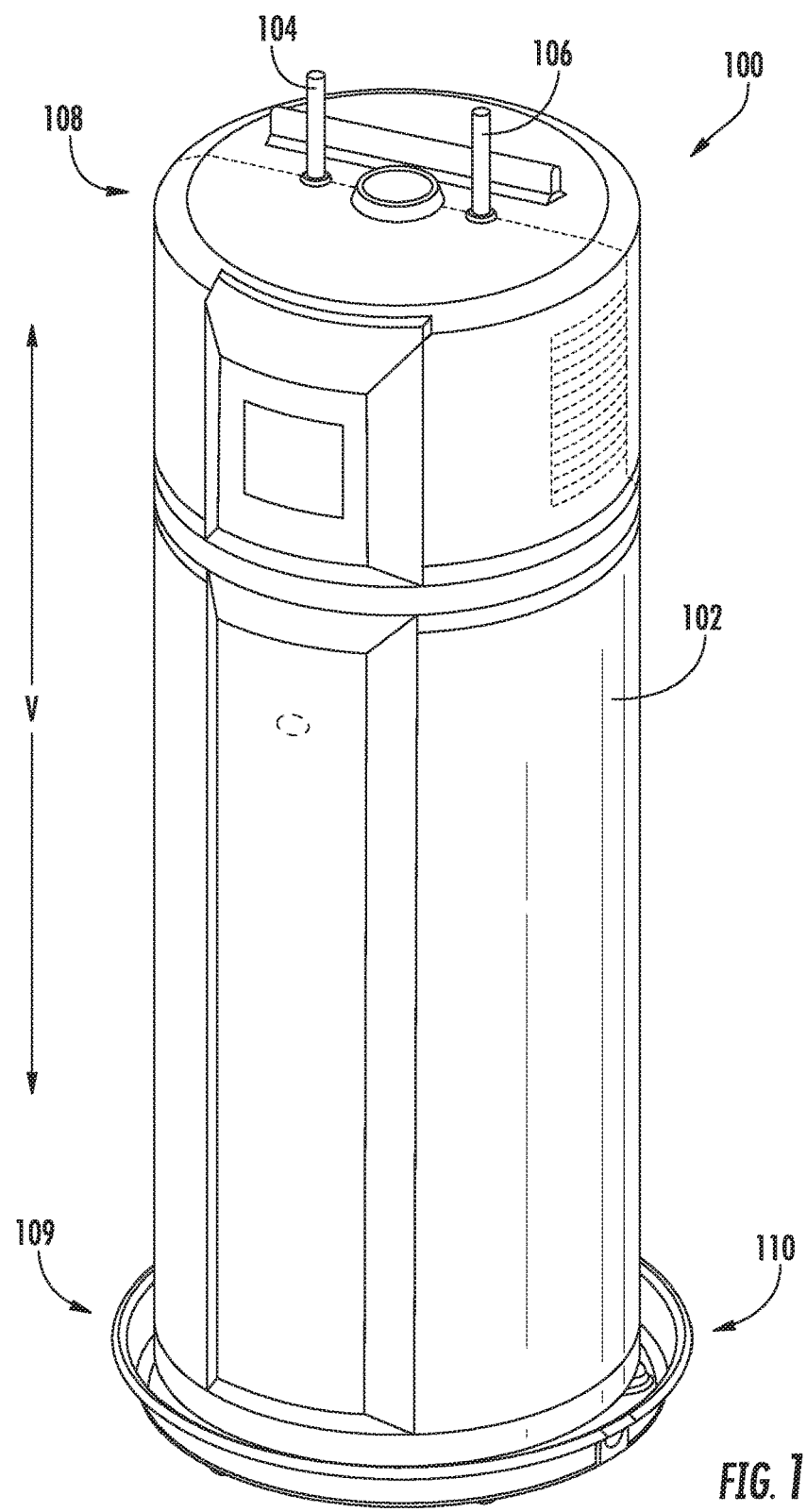
FIG. 1 provides a perspective view of a water heater appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
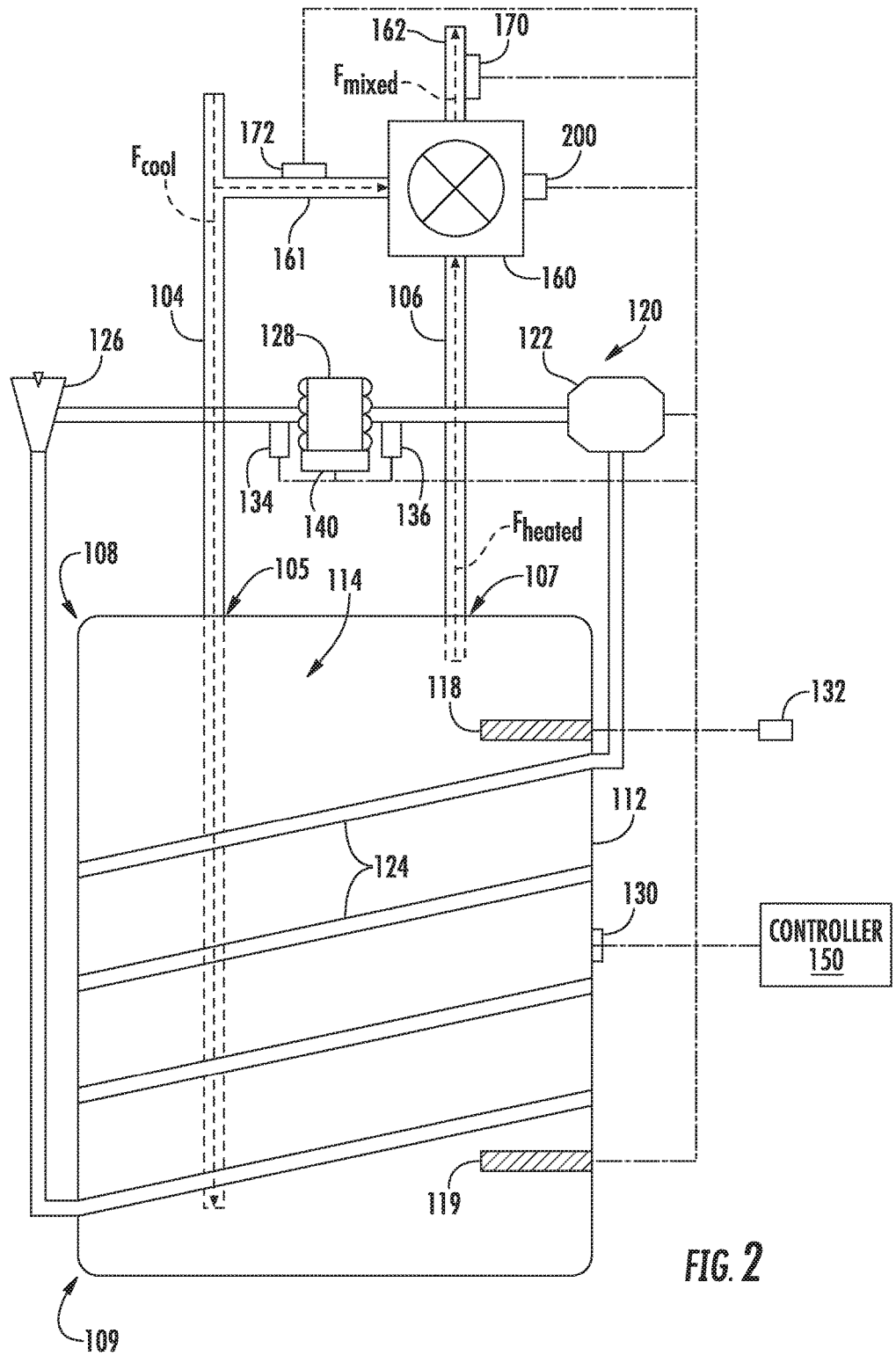
FIG. 2 provides a schematic view of certain components of the exemplary water heater appliance of FIG. 1.

FIG. 1 provides a perspective view of a water heater appliance 100 according to an exemplary embodiment of the present subject matter. FIG. 2 provides a schematic view of certain components of water heater appliance 100. As may be seen in FIGS. 1 and 2, water heater appliance 100 includes a casing 102 and a tank 112 mounted within casing 102. Tank 112 defines an interior volume 114 for heating water therein.

Water heater appliance 100 also includes an inlet conduit 104 and an outlet conduit 106 that are both in fluid communication with tank 112 within casing 102. As an example, cold water from a water source, e.g., a municipal water supply or a well, enters water heater appliance 100 through inlet conduit 104. From inlet conduit 104, such cold water enters interior volume 114 of tank 112 wherein the water is heated to generate heated water. Such heated water exits water heater appliance 100 at outlet conduit 106 and, e.g., is supplied to a bath, shower, sink, or any other suitable feature.

As may be seen in FIG. 1, water heater appliance 100 extends between a top portion 108 and a bottom portion 109 along a vertical direction V. Thus, water heater appliance 100 is generally vertically oriented. Water heater appliance 100 can be leveled, e.g., such that casing 102 is plumb in the vertical direction V, in order to facilitate proper operation of water heater appliance 100.

A drain pan 110 is positioned at bottom portion 109 of water heater appliance 100 such that water heater appliance 100 sits on drain pan 110. Drain pan 110 sits beneath water heater appliance 100 along the vertical direction V, e.g., to collect water that leaks from water heater appliance 100 or water that condenses on an evaporator 128 of water heater appliance 100. It should be understood that water heater appliance 100 is provided by way of example only and that the present subject matter may be used with any suitable water heater appliance.

Turning now to FIG. 2, water heater appliance 100 includes an upper heating element 118, a lower heating element 119 and a sealed system 120 for heating water within interior volume 114 of tank 112. Thus, water heater appliance 100 is commonly referred to as a "heat pump water heater appliance." Upper and lower heating elements 118 and 119 can be any suitable heating elements. For example, upper heating element 118 and/or lower heating element 119 may be an electric resistance element, an induction element, or any other suitable heating element or combination thereof. Lower heating element 119 may also be a gas burner.

Sealed system 120 includes a compressor 122, a condenser 124, a throttling device 126 and an evaporator 128. Condenser 124 is thermally coupled or assembled in a heat exchange relationship with tank 112 in order to heat water within interior volume 114 of tank 112 during operation of sealed system 120. In particular, condenser 124 may be a conduit coiled around and mounted to tank 112. During operation of sealed system 120, refrigerant exits evaporator 128 as a fluid in the form of a superheated vapor and/or high quality vapor mixture. Upon exiting evaporator 128, the refrigerant enters compressor 122 wherein the pressure and temperature of the refrigerant are increased such that the refrigerant becomes a superheated vapor. The superheated vapor from compressor 122 enters condenser 124 wherein it transfers energy to the water within tank 112 and condenses into a saturated liquid and/or high quality liquid vapor mixture. This high quality/saturated liquid vapor mixture exits condenser 124 and travels through throttling device 126 that is configured for regulating a flow rate of refrigerant therethrough. Upon exiting throttling device 126, the pressure and temperature of the refrigerant drop at which time the refrigerant enters evaporator 128 and the cycle repeats itself. In certain exemplary embodiments, throttling device 126 may be an electronic expansion valve (EEV).

A fan or air handler 140 may assist with heat transfer between air about water heater appliance 100, e.g., within casing 102, and refrigerant within evaporator 128. Air handler 140 may be positioned within casing 102 on or adjacent evaporator 128. Thus, when activated, air handler 140 may direct a flow of air towards or across evaporator 128, and the flow of air from air handler 140 may assist with heating refrigerant within evaporator 128. Air handler 140 may be any suitable type of air handler, such as an axial or centrifugal fan.

Water heater appliance 100 also includes a tank temperature sensor 130. Tank temperature sensor 130 is configured for measuring a temperature of water within interior volume 114 of tank 112. Tank temperature sensor 130 can be positioned at any suitable location within or on water heater appliance 100. For example, tank temperature sensor 130 may be positioned within interior volume 114 of tank 112 or may be mounted to tank 112 outside of interior volume 114 of tank 112. When mounted to tank 112 outside of interior volume 114 of tank 112, tank temperature sensor 130 can be configured for indirectly measuring the temperature of water within interior volume 114 of tank 112. For example, tank temperature sensor 130 can measure the temperature of tank 112 and correlate the temperature of tank 112 to the temperature of water within interior volume 114 of tank 112. Tank temperature sensor 130 may also be positioned at or adjacent top portion 108 of water heater appliance 100, e.g., at or adjacent an inlet of outlet conduit 106.

Tank temperature sensor 130 can be any suitable temperature sensor. For example, tank temperature sensor 130 may be a thermocouple or a thermistor. As may be seen in FIG. 2, tank temperature sensor 130 may be the only temperature sensor positioned at or on tank 112 that is configured for measuring the temperature of water within interior volume 114 of tank 112 in certain exemplary embodiments. In alternative exemplary embodiments, additional temperature sensors may be positioned at or on tank 112 to assist tank temperature sensor 130 with measuring the temperature of water within interior volume 114 of tank 112, e.g., at other locations within interior volume 114 of tank 112.

Water heater appliance 100 also includes an ambient temperature sensor 132, an evaporator inlet temperature sensor 134 and an evaporator outlet temperature sensor 136. Ambient temperature sensor 132 is configured for measuring a temperature of air about water heater appliance 100. Ambient temperature sensor 132 can be positioned at any suitable location within or on water heater appliance 100. For example, ambient temperature sensor 132 may be mounted to casing 102, e.g., at or adjacent top portion 108 of water heater appliance 100. Ambient temperature sensor 132 can be any suitable temperature sensor. For example, ambient temperature sensor 132 may be a thermocouple or a thermistor.

Evaporator inlet temperature sensor 134 is configured for measuring a temperature of refrigerant at or adjacent inlet of evaporator 128. Thus, evaporator inlet temperature sensor 134 may be positioned at or adjacent inlet of evaporator 128, as shown in FIG. 2. For example, evaporator inlet temperature sensor 134 may be mounted to tubing that directs refrigerant into evaporator 128, e.g., at or adjacent inlet of evaporator 128. When mounted to tubing, evaporator inlet temperature sensor 134 can be configured for indirectly measuring the temperature of refrigerant at inlet of evaporator 128. For example, evaporator inlet temperature sensor 134 can measure the temperature of the tubing and correlate the temperature of the tubing to the temperature of refrigerant at inlet of evaporator 128. Evaporator inlet temperature sensor 134 can be any suitable temperature sensor. For example, evaporator inlet temperature sensor 134 may be a thermocouple or a thermistor.

Evaporator outlet temperature sensor 136 is configured for measuring a temperature of refrigerant at or adjacent outlet of evaporator 128. Thus, evaporator outlet temperature sensor 136 may be positioned at or adjacent outlet of evaporator 128, as shown in FIG. 2. For example, evaporator outlet temperature sensor 136 may be mounted to tubing that directs refrigerant out of evaporator 128, e.g., at or adjacent outlet of evaporator 128. When mounted to tubing, evaporator outlet temperature sensor 136 can be configured for indirectly measuring the temperature of refrigerant at outlet of evaporator 128. For example, evaporator outlet temperature sensor 136 can measure the temperature of the tubing and correlate the temperature of the tubing to the temperature of refrigerant at outlet of evaporator 128. Evaporator outlet temperature sensor 136 can be any suitable temperature sensor. For example, evaporator outlet temperature sensor 136 may be a thermocouple or a thermistor.

Water heater appliance 100 further includes a controller 150 that is configured for regulating operation of water heater appliance 100. Controller 150 is in, e.g., operative, communication with upper heating element 118, lower heating element 119, compressor 122, tank temperature sensor 130, ambient temperature sensor 132, evaporator inlet temperature sensor 134, evaporator outlet temperature sensor 136, and air handler 140. Thus, controller 150 may selectively activate upper and lower heating elements 118 and 119 and/or compressor 122 in order to heat water within interior volume 114 of tank 112, e.g., in response to signals from tank temperature sensor 130, ambient temperature sensor 132, evaporator inlet temperature sensor 134 and/or evaporator outlet temperature sensor 136.

Controller 150 includes memory and one or more processing devices such as microprocessors, CPUs or the like, such as general or special purpose microprocessors operable to execute programming instructions or micro-control code associated with operation of water heater appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 150 may operate upper heating element 118, lower heating element 119 and/or compressor 122 in order to heat water within interior volume 114 of tank 112. As an example, a user may select or establish a set temperature, $t_s$, for water within interior volume 114 of tank 112, or the set temperature $t_s$ for water within interior volume 114 of tank 112 may be a default value. Based upon the set temperature $t_s$ for water within interior volume 114 of tank 112, controller 150 may selectively activate upper heating element 118, lower heating element 119 and/or compressor 122 in order to heat water within interior volume 114 of tank 112 to the set temperature $t_s$ for water within interior volume 114 of tank 112. The set temperature $t_s$ for water within interior volume 114 of tank 112 may be any suitable temperature. For example, the set temperature $t_s$ for water within interior volume 114 of tank 112 may be between about one hundred degrees Fahrenheit and about one hundred and eighty-degrees Fahrenheit. As used herein with regards to temperature approximations, the term "about" means within ten degrees of the stated temperature.

As may be seen in FIG. 2, water heater appliance 100 also includes a mixing valve 200 and a mixed water outlet conduit 162. Mixing valve 200 is in fluid communication with inlet conduit 104 via a bypass conduit 161, tank 112, and mixed water outlet conduit 162. As discussed in greater detail below, mixing valve 200 is configured for selectively directing water from inlet conduit 104 and tank 112 into mixed water outlet conduit 162 in order to regulate a temperature of water within mixed water outlet conduit 162. Mixing valve 200 may be positioned or disposed within casing 102 of water heater appliance 100, e.g., such that mixing valve 200 is integrated within water heater appliance 100.

As an example, mixing valve 200 can selectively adjust between a first position and a second position. In the first position, mixing valve 200 can permit a first flow rate of relatively cool water from inlet conduit 104 (shown schematically with arrow labeled $F_{cool}$ in FIG. 2) into mixed water outlet conduit 162 and mixing valve 200 can also permit a first flow rate of relatively hot water from outlet conduit 106 (shown schematically with arrow labeled $F_{heated}$ in FIG. 2) into mixed water outlet conduit 162. In such a manner, water within mixed water outlet conduit 162 (shown schematically with arrow labeled $F_{mixed}$ in FIG. 2) can have a first particular temperature when mixing valve 200 is in the first position. Similarly, mixing valve 200 can permit a second flow rate of relatively cool water from inlet conduit 104 into mixed water outlet conduit 162 and mixing valve 200 can also permit a second flow rate of relatively hot water from outlet conduit 106 into mixed water outlet conduit 162 in the second position. The first and second flow rates of the relatively cool water and relatively hot water are different such that water within mixed water outlet conduit 162 can have a second particular temperature when mixing valve 200 is in the second position. In such a manner, mixing valve 200 can regulate the temperature of water within mixed water outlet conduit 162 and adjust the temperature of water within mixed water outlet conduit 162 between the first and second particular temperatures.

It should be understood that, in certain exemplary embodiments, mixing valve 200 is adjustable between more positions than the first and second positions. In particular, mixing valve 200 may be adjustable between any suitable number of positions in alternative exemplary embodiments. For example, mixing valve 200 may be infinitely adjustable in order to permit fine-tuning of the temperature of water within mixed water outlet conduit 162.

Water heater appliance 100 also includes a position sensor 164. Position sensor 164 is configured for determining a position of mixing valve 200. Position sensor 164 can monitor the position of mixing valve 200 in order to assist with regulating the temperature of water within mixed water outlet conduit 162. For example, position sensor 164 can determine when mixing valve 200 is in the first position or the second position in order to ensure that mixing valve 200 is properly or suitably positioned depending upon the temperature of water within mixed water outlet conduit 162 desired or selected. Thus, position sensor 164 can provide feedback regarding the status or position of mixing valve 200.

Position sensor 164 may be any suitable type of sensor. For example, position sensor 164 may be a physical sensor, such as an optical sensor, Hall-effect sensor, etc. In alternative exemplary embodiments, water heater appliance 100 need not include position sensor 164, and controller 150 may determine or measure a motor position of mixing valve 200 based on a previously commanded position of mixing valve 200. Thus, controller 150 may determine that the current position of mixing valve 200 corresponds to a latest position that controller 150 commanded for mixing valve 200 in a previous iteration.

Water heater appliance 100 also includes a mixed water conduit temperature sensor or first temperature sensor 170 and an inlet conduit temperature sensor or second temperature sensor 172. First temperature sensor 170 is positioned on or proximate mixed water outlet conduit 162 and is configured for measuring a temperature of water within mixed water outlet conduit 162. First temperature sensor 170 is also positioned downstream of mixing valve 200. Second temperature sensor 172 is positioned on or proximate inlet conduit 104 or bypass conduit 161 and is configured for measuring a temperature of water within inlet conduit 104 or bypass conduit 161. Second temperature sensor 172 is positioned upstream of mixing valve 200. In certain exemplary embodiments, first temperature sensor 170 and/or second temperature sensor 172 may be positioned proximate or adjacent mixing valve 200. First and second temperature sensors 170, 172 may be any suitable type of temperature sensors, such as a thermistor or thermocouple.

Controller 150 can also operate mixing valve 200 to regulate the temperature of water within mixed water outlet conduit 162. For example, controller 150 can adjust the position of mixing valve 200 in order to regulate the temperature of water within mixed water outlet conduit 162. As an example, a user can select or establish a set-point temperature of mixing valve 200, or the set-point temperature of mixing valve 200 may be a default value. Based upon the set-point temperature of mixing valve 200, controller 150 can adjust the position of mixing valve 200 in order to change or tweak a ratio of relatively cool water flowing into mixed water outlet conduit 162 from inlet conduit 104 and relatively hot water flowing into mixed water outlet conduit 162 from outlet conduit 106. In such a manner, controller 150 can regulate the temperature of water within mixed water outlet conduit 162.

The set-point temperature of mixing valve 200 can be any suitable temperature. For example, the set-point temperature of mixing valve 200 may be between about one hundred degrees Fahrenheit and about one hundred and twenty degrees Fahrenheit. In particular, the set-point temperature of mixing valve 200 may be selected such that the set-point temperature of mixing valve 200 is less than the set-point temperature for water within interior volume 114 of tank 112. In such a manner, mixing valve 200 can utilize water from inlet conduit 104 and tank 112 to regulate the temperature of water within mixed water outlet conduit 162.

Figure 3:
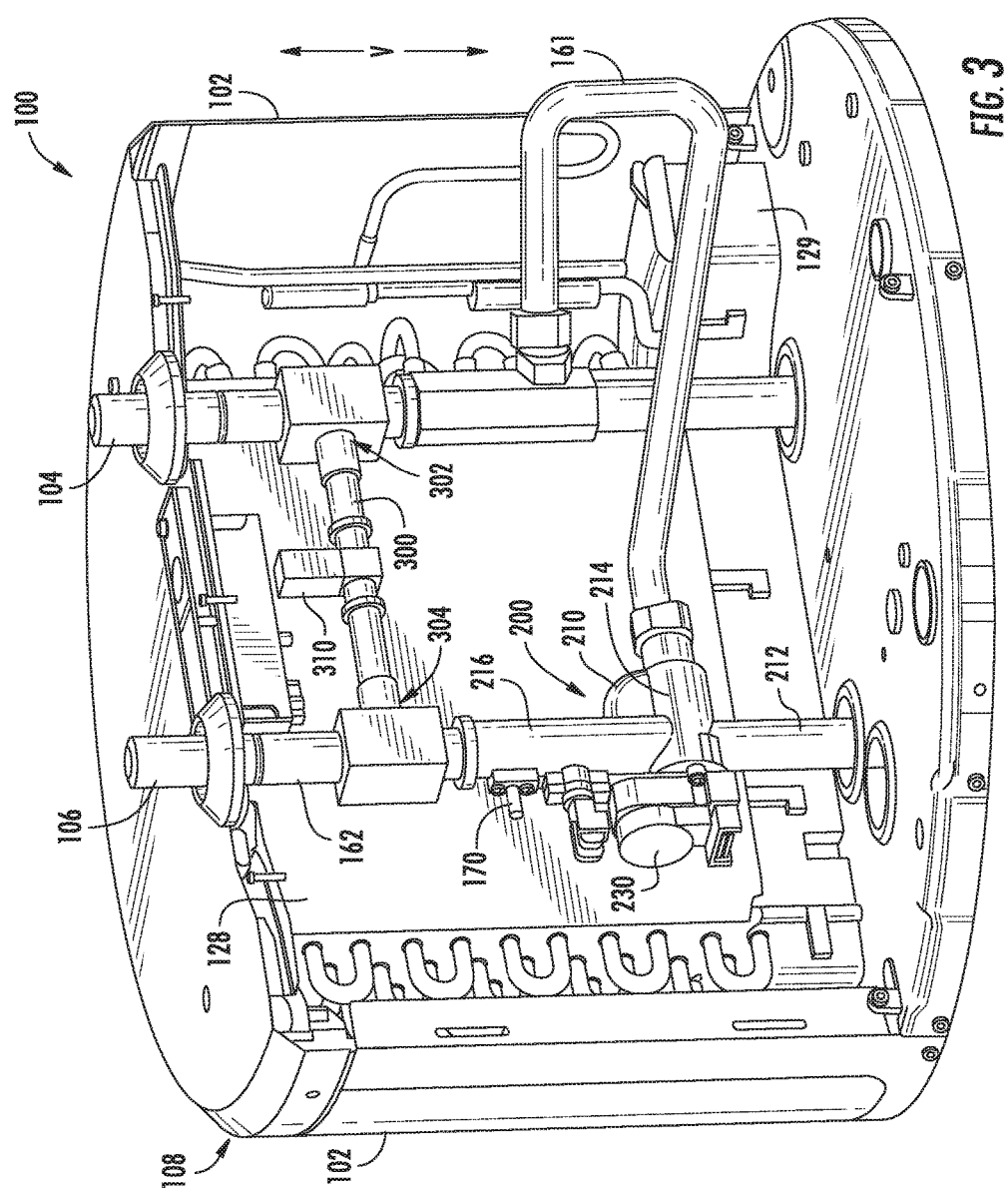
FIG. 3 provides a partial, perspective view of certain components of the exemplary water heater appliance of FIG. 1.
Figure 4:
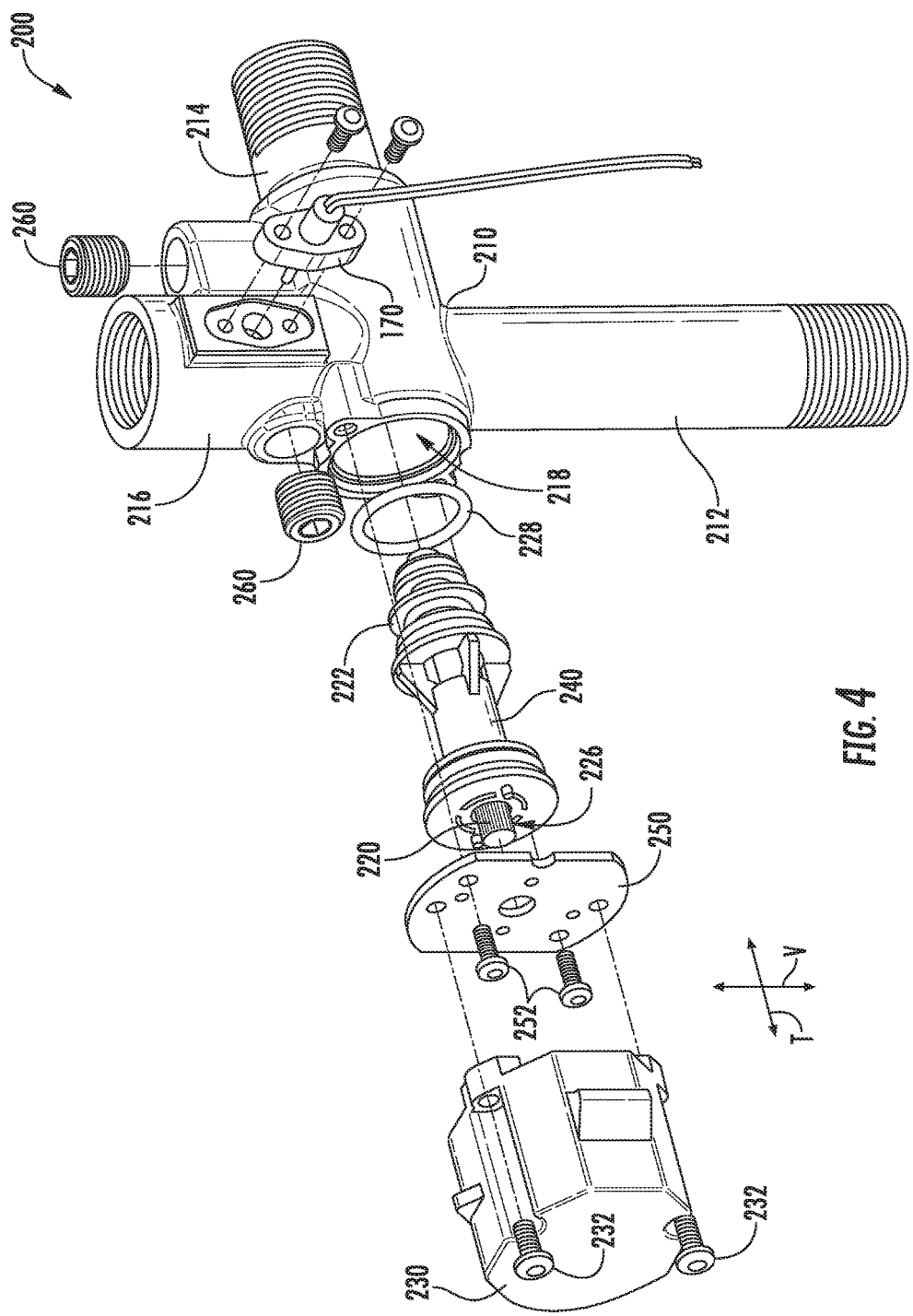
FIG. 4 provides an exploded view of a mixing valve of the exemplary water heater appliance of FIG. 1.

FIG. 3 provides a partial, section view of water heater appliance 100 at top portion 108 of water heater appliance 100. FIG. 4 provides an exploded view of mixing valve 200 of water heater appliance 100. It should be understood that, while described in greater detail below in the context of water heater appliance 100, mixing valve 200 may be used in or with any other suitable water heater appliance in alternative exemplary embodiments. As may be seen in FIG. 3, mixing valve 200 may be positioned within casing 102 at or adjacent top portion 108 of water heater appliance 100. In particular, mixing valve 200 may be positioned within casing 102 above tank 112 and, e.g., in a vertical plane between evaporator 128 and compressor 122 of sealed system 120.

As may be seen in FIGS. 3 and 4, mixing valve 200 includes a valve body 210. Valve body 210 has a heated water conduit 212, a cold water conduit 214, a mixed water conduit 216 and a mixing chamber 218. As may be seen in FIG. 3, heated water conduit 212 of valve body 210 is coupled to tank 112 at an outlet 107 of tank 112. As an example, heated water conduit 212 of valve body 210 may be threaded to tank 112 at outlet 107 of tank 112 such that heated water conduit 212 of valve body 210 forms at least a portion of outlet conduit 106. Bypass conduit 161 is coupled to cold water conduit 214 of valve body 210. Accordingly, heated water from interior volume 114 of tank 112 may flow into mixing chamber 218 of valve body 210 via heated water conduit 212 of valve body 210, and cold water from inlet conduit 104 may flow into mixing chamber 218 of valve body 210 via cold water conduit 214 of valve body 210.

Valve body 210 may be formed such that heated water conduit 212, cold water conduit 214 and mixed water conduit 216 of valve body 210 are integrally formed with one another. Thus, e.g., valve body 210 may be cast from a suitable metal, such as steel, aluminum, bronze, etc. Valve body 210 may also be formed of any other suitable rigid and/or ductile material, such as a plastic, a composite, etc., that is suitable for shipping and installing water heater appliance 100 without fracturing valve body 210. In alternative exemplary embodiments, valve body 210 may be formed such that heated water conduit 212, cold water conduit 214 and mixed water conduit 216 of valve body 210 are separately formed and then mounted to one another.

Mixing valve 200 also includes a plunger 220 and a support bracket 240. Plunger 220 is positioned within valve body 210 at mixing chamber 218 of valve body 210. Plunger 220 has a head 222. Head 222 of plunger 220 assists with regulating water flow into mixing chamber 218 of valve body 210, as discussed in greater detail below. Support bracket 240 is also positioned within valve body 210 at mixing chamber 218 of valve body 210. Support bracket 240 engages plunger 220 within valve body 210 in order to support plunger 220 within valve body 210.

Turning to FIG. 4, mixing valve 200 includes a mounting plate 250. Mounting plate 250 is coupled to valve body 210. Any suitable method or mechanism may be used to couple mounting plate 250 to valve body 210. For example, plate fasteners 252 may extend through mounting plate 250 into valve body 210 in order to couple mounting plate 250 to valve body 210. Mounting plate 250 contacts support bracket 240 such that mounting plate 250 retains or holds support bracket 240 within mixing chamber 218 of valve body 210.

Mixing valve 200 further includes a motor 230, such as a stepper motor. Thus, mixing valve 200 is generally referred to as an "electronic mixing valve." Motor 230 is coupled to plunger 220, and motor 230 is operable to adjust a position of the head 222 of plunger 220 within valve body 210. For example, motor 230 may engage splines 226 formed on an end of plunger 220 opposite the head 222 of plunger 220, and motor 230 may rotate plunger 220 relative to support bracket 240 such that a threaded connection between plunger 220 and support bracket 240 moves the head 222 of plunger 220 within mixing chamber 218 of valve body 210.

Controller 150 is in operative communication with mixing valve 200, e.g., motor 230 of mixing valve 200, and controller 150 may be configured to operate motor 230 of mixing valve 200 according to a proportional-integral-derivative control loop (P-I-D control loop). The P-I-D control loop may operate motor 230 to adjust the position of head 222 of plunger 220 within mixing chamber 218 of valve body 210 and thereby adjust the mixing ratio of mixing valve 200. In such a manner, the P-I-D control loop may drive the temperature of water within mixed water outlet conduit 162 to or towards the set-point temperature of mixing valve 200. The P-I-D control loop may utilize temperature measurements from first temperature sensor 170. In particular, the P-I-D control loop may operate motor 230 to drive the temperature measurements from first temperature sensor 170 to or towards the set-point temperature of mixing valve 200.

Motor 230 may be positioned on mounting plate 250, e.g., on a side of valve body 210 positioned opposite cold water conduit 214 of valve body 210. Any suitable method or mechanism may be used to couple motor 230 to mounting plate 250. For example, motor fasteners 232 may extend through motor 230 into mounting bracket 250 in order to couple motor 230 to mounting plate 250. Such arrangement of motor 230 on valve body 210 may assist with accessing motor 230 within casing 102 of water heater appliance 100.

For example, a service technician or owner of water heater appliance 100 may remove motor 230 from valve body 210, e.g., by removing motor fasteners 232, without having to remove valve body 210 from casing 102 of water heater appliance 100 or having to remove mounting plate 250 from valve body 210 and thereby unsealing valve body 210.

Mixing valve 200 also includes various seals 228. Certain seals of seals 228 that extend between support bracket 240 and valve body 210 in order to limit leakage of water from mixing chamber 218 of valve body 210. In addition, other seals of seals 228 extend between plunger 220 and valve body 210 in order to assist with limiting leakage of water around the head 222 of plunger 220. Mixing valve 200 further includes plugs 260 mounted to valve body 210, e.g., that seal openings used to form or machine valve body 210. First temperature sensor 170 may also be mounted to valve body 210, e.g., at mixed water conduit 216, as shown in FIG. 4.

Turning now to FIG. 3, water heater appliance 100 also includes features for bypassing cold water from inlet conduit 104 around mixing valve 200. In particular, water heater appliance 100 includes a cold water bypass conduit 300 and a cold water bypass valve 310. Cold water bypass conduit 300 and/or cold water bypass valve 310 may be positioned within casing 102 at or adjacent top portion 108 of water heater appliance 100 over tank 112. Thus, cold water bypass conduit 300 and/or cold water bypass valve 310 along with mixing valve 200 may be integrated within water heater appliance 100.

Cold water bypass conduit 300 extends between inlet conduit 104 and mixed water outlet conduit 162. In particular, an inlet 302 of cold water bypass conduit 300 may be positioned at inlet conduit 104 such that cold water from inlet conduit 104 is flowable into cold water bypass conduit 300 at inlet 302 of cold water bypass conduit 300. Conversely, an outlet 304 of cold water bypass conduit 300 may be positioned at mixed water outlet conduit 162 such that water from cold water bypass conduit 300 is flowable into mixed water outlet conduit 162 at outlet 304 of cold water bypass conduit 300. Outlet 304 of cold water bypass conduit 300 may also be positioned downstream of a mixed water outlet 217 of mixing valve 200 on mixed water outlet conduit 162. Thus, e.g., water from cold water bypass conduit 300 may flow into water outlet conduit 162 downstream of mixing valve 200.

Cold water bypass conduit 300 may be separate from bypass conduit 161. Thus, water heater appliance 100 may include two bypass conduits: (1) bypass conduit 161 that extends between inlet conduit 104 and cold water conduit 214 of valve body 210; and (2) cold water bypass conduit 300 that extends between inlet conduit 104 and mixed water outlet conduit 162. Thus, water from inlet conduit 104 may be flowable through bypass conduit 161 to mixing valve 200 and may also be flowable through cold water bypass conduit 300 to mixed water outlet conduit 162 downstream of mixing valve 200.

Cold water bypass valve 310 is positioned on or coupled to cold water bypass conduit 300. Cold water bypass valve 310 is operable to provide selective fluid communication between inlet conduit 104 and mixed water outlet conduit 162 through cold water bypass conduit 300. For example, cold water bypass valve 310 allows water to flow through cold water bypass conduit 300 into mixed water outlet conduit 162 when cold water bypass valve 310 is open. Conversely, cold water bypass valve 310 blocks or limits cold water to flow through cold water bypass conduit 300 into mixed water outlet conduit 162 when cold water bypass valve 310 is closed. Thus, by selectively opening and closing, cold water bypass valve 310 may regulate the flow of water through cold water bypass conduit 300 into mixed water outlet conduit 162.

Cold water bypass valve 310 may be any suitable type of valve. For example, cold water bypass valve 310 may be a solenoid valve. Thus, e.g., controller 150 may open and close cold water bypass valve 310 by regulating an electric control signal, such as a current or voltage, to cold water bypass valve 310. As a particular example, cold water bypass valve 310 may be a normally open solenoid valve. Thus, cold water bypass valve 310 may be open when no signal is received from controller 150, and cold water bypass valve 310 may close in response to a signal from controller 150.

As noted above, controller 150 is in operative communication with cold water bypass valve 310 such that cold water bypass valve 310 opens and/or closes in response to signals from controller 150. Controller 150 is also in communication with first temperature sensor 170, and controller 150 may open and/or close cold water bypass valve 310 in response to signals from first temperature sensor 170. For example, controller 150 may be configured to close cold water bypass valve 310 when or in response to a temperature measurement from first temperature sensor 170 being less than a threshold temperature. Thus, when the temperature of water within mixed water outlet conduit 162 as measured by first temperature sensor 170 is less than the threshold temperature, controller 150 may signal cold water bypass valve 310 in order to close cold water bypass valve 310 and limit liquid flow through cold water bypass conduit 300.

Controller 150 may also be configured to open cold water bypass valve 310 when or in response to the temperature measurement from first temperature sensor 170 being greater than the threshold temperature. Thus, e.g., when the temperature of water within mixed water outlet conduit 162 as measured by first temperature sensor 170 is greater than the threshold temperature, controller 150 may signal cold water bypass valve 310 in order to open cold water bypass valve 310 and allow liquid flow through cold water bypass conduit 300. As noted above, cold water bypass valve 310 may be a normally open valve. Thus, controller 150 may simply stop signaling cold water bypass valve 310 to open in order to close cold water bypass valve 310 in certain exemplary embodiments.

The threshold temperature may be any suitable temperature. For example, the threshold temperature may be no greater than one hundred and forty degrees Fahrenheit (140° F.) and/or no less than one hundred degrees Fahrenheit (100° F.) or any temperature between. In certain exemplary embodiments, the threshold temperature may be about equal to the set-point temperature of mixing valve 200. Thus, controller 150 may also be configured to close cold water bypass valve 310 only when the temperature of water within mixed water outlet conduit 162 as measured by first temperature sensor 170 is about equal to the set-point temperature of mixing valve 200.

The cold water bypass conduit 300 and cold water bypass valve 310 direct cold water into mixed water outlet conduit 162 when the temperature of water within mixed water outlet conduit 162 as measured by first temperature sensor 170 is greater than the threshold temperature. Operating cold water bypass valve 310 in such a manner can assist with limiting a slug of hot water from passing downstream of mixing valve 200. By keeping the cold water bypass valve 310 open until the temperature of water within mixed water outlet conduit 162 as measured by first temperature sensor 170 approaches the set-point temperature of mixing valve 200, water downstream of the mixed water outlet conduit 162 may be kept at less than the set-point temperature of mixing valve 200 until mixing valve 200 has time to adjust to an appropriate mixing ratio corresponding to the set-point temperature of mixing valve 200, e.g., using the P-I-D control loops and temperature measurements from first temperature sensor 170.

Cold water bypass conduit 300 and/or cold water bypass valve 310 may be sized to pass a specific flow rate of water through cold water bypass conduit 300 when cold water bypass valve 310 is open. For example, one or more of cold water bypass valve 310 and cold water bypass conduit 300 may be sized or restricted such that the flow rate of water through cold water bypass conduit 300 is no greater than one and a half gallons per minute when cold water bypass valve 310 is open. Thus, a limited volume of water may flow through cold water bypass conduit 300 when cold water bypass valve 310 is open. Such restriction may assist with avoiding completely bypassing tank 114 and mixing valve 200.

While described above in the context of water heater appliance 100, it will be understood that the present subject matter may be used in or with any suitable water heater appliance in alternative exemplary embodiments. For example, cold water bypass conduit 300 and cold water bypass valve 310 may be used in an electric water heater appliance without sealed system 120. Thus, the present subject matter is not limited to only heat pump water heater appliances.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water heater appliance, comprising:
   a casing;
   a tank positioned within the casing;
   a heating element operable to heat water within the tank;
   a cold water inlet conduit mounted to the tank;
   a hot water outlet conduit mounted to the tank;
   an electronic mixing valve positioned within the casing, the electronic mixing valve having a cold water inlet and a hot water inlet, the cold water inlet of the electronic mixing valve in fluid communication with the cold water inlet conduit, the hot water inlet of the electronic mixing valve in fluid communication with the hot water outlet conduit, the electronic mixing valve configured for adjusting a ratio of cold water from the cold water inlet conduit to hot water from the hot water outlet conduit at a mixed water outlet of the electronic mixing valve;
   a mixed water outlet conduit in fluid communication with the mixed water outlet of the electronic mixing valve;
   a mixed water temperature sensor positioned proximate the mixed water outlet of the electronic mixing valve;
   a cold water bypass conduit extending between the cold water inlet conduit and the mixed water outlet conduit;

a cold water bypass valve on the cold water bypass conduit, the cold water bypass valve operable to provide selective fluid communication between the cold water inlet conduit and the mixed water outlet conduit through the cold water bypass conduit; and a controller in operative communication with the cold water bypass valve and the mixed water temperature sensor, the controller configured to open the cold water bypass valve when a temperature measurement from the mixed water temperature sensor is greater than a threshold temperature.

2. The water heater appliance of claim 1, wherein the cold water bypass valve is a solenoid valve.

3. The water heater appliance of claim 2, wherein the cold water bypass valve is a normally open solenoid valve.

4. The water heater appliance of claim 1, wherein the controller is in operative communication with the electronic mixing valve, the controller is configured to operate a stepper motor of the electronic mixing valve according to a proportional-integral-derivative control loop to a temperature of water within the mixed water outlet conduit to a set temperature of the electronic mixing valve.

5. The water heater appliance of claim 4, wherein the controller is configured to close the cold water bypass valve when the temperature measurement from the mixed water temperature sensor is less than the threshold temperature.

6. The water heater appliance of claim 5, wherein the threshold temperature is no greater than one hundred and forty degrees Fahrenheit.

7. The water heater appliance of claim 1, wherein one or more of the cold water bypass valve and the cold water bypass conduit are sized such that a flow rate of cold water through the cold water bypass conduit is no greater than one and a half gallons per minute.

8. The water heater appliance of claim 1, wherein an outlet of the cold water bypass conduit is positioned downstream of the mixed water outlet of the electronic mixing valve on the mixed water outlet conduit.

9. The water heater appliance of claim 1, wherein the cold water bypass valve and the electronic mixing valve are positioned over the tank and within the casing at a top portion of the casing.

10. The water heater appliance of claim 1, wherein the heating element comprises one or more of a resistance heating element and a sealed system.

11. A heat pump water heater appliance, comprising:

a casing;

a tank positioned within the casing;

a sealed system operable to heat water within the tank, the sealed system comprising a compressor, a condenser, an expansion device and an evaporator charged with refrigerant;

a cold water inlet conduit mounted to the tank;

a hot water outlet conduit mounted to the tank;

an electronic mixing valve positioned within the casing, the electronic mixing valve having a cold water inlet and a hot water inlet, the cold water inlet of the electronic mixing valve in fluid communication with the cold water inlet conduit, the hot water inlet of the electronic mixing valve in fluid communication with the hot water outlet conduit, the electronic mixing valve configured for adjusting a ratio of cold water from the cold water inlet conduit to hot water from the hot water outlet conduit at a mixed water outlet of the electronic mixing valve;

a mixed water outlet conduit in fluid communication with the mixed water outlet of the electronic mixing valve;

a mixed water temperature sensor positioned proximate the mixed water outlet of the electronic mixing valve;

a cold water bypass conduit extending between the cold water inlet conduit and the mixed water outlet conduit;

a cold water bypass valve on the cold water bypass conduit, the cold water bypass valve operable to provide selective fluid communication between the cold water inlet conduit and the mixed water outlet conduit through the cold water bypass conduit; and a controller in operative communication with the cold water bypass valve and the mixed water temperature sensor, the controller configured to open the cold water bypass valve when a temperature measurement from the mixed water temperature sensor is greater than a threshold temperature.

12. The heat pump water heater appliance of claim 11, wherein the cold water bypass valve is a solenoid valve.

13. The heat pump water heater appliance of claim 12, wherein the cold water bypass valve is a normally open solenoid valve.

14. The heat pump water heater appliance of claim 11, wherein the controller is in operative communication with the electronic mixing valve, the controller is configured to operate a stepper motor of the electronic mixing valve according to a proportional-integral-derivative control loop to a temperature of water within the mixed water outlet conduit to a set temperature of the electronic mixing valve.

15. The heat pump water heater appliance of claim 14, wherein the controller is configured to close the cold water bypass valve when the temperature measurement from the mixed water temperature sensor is less than the threshold temperature.

16. The heat pump water heater appliance of claim 15, wherein the threshold temperature is no greater than one hundred and forty degrees Fahrenheit.

17. The heat pump water heater appliance of claim 11, wherein one or more of the cold water bypass valve and the cold water bypass conduit are sized such that a flow rate of cold water through the cold water bypass conduit is no greater than one and a half gallons per minute.

18. The heat pump water heater appliance of claim 11, wherein an outlet of the cold water bypass conduit is positioned downstream of the mixed water outlet of the electronic mixing valve on the mixed water outlet conduit.

19. The heat pump water heater appliance of claim 11, wherein the cold water bypass valve and the electronic mixing valve are positioned over the tank and within the casing at a top portion of the casing.

20. The heat pump water heater appliance of claim 11, further comprising a resistance heating element mounted to the tank.

* * * * *